(12) United States Patent
Kim

(10) Patent No.: US 7,193,953 B2
(45) Date of Patent: Mar. 20, 2007

(54) HOLOGRAPHIC RECORDING AND RECONSTRUCTING APPARATUS AND MASK FOR USE THEREIN

(75) Inventor: Kun Yul Kim, Seoul (KR)

(73) Assignee: Daewoo Electronics Corporation, Seoul (KR)

( * ) Notice: Subject to any disclaimer, the term of this patent is extended or adjusted under 35 U.S.C. 154(b) by 561 days.

(21) Appl. No.: 10/820,823

(22) Filed: Apr. 9, 2004

(65) Prior Publication Data

US 2005/0105445 A1   May 19, 2005

(30) Foreign Application Priority Data

Nov. 17, 2003   (KR) .................. 10-2003-0081118

(51) Int. Cl.
*G11B 7/00* (2006.01)

(52) U.S. Cl. ....................... 369/103; 369/118
(58) Field of Classification Search .................. None
See application file for complete search history.

(56) References Cited

U.S. PATENT DOCUMENTS

| 5,335,296 | A | 8/1994 | Larkin et al. |
| 5,511,058 | A | 4/1996 | Visel et al. |
| 5,539,534 | A | 7/1996 | Hino et al. |
| 5,694,488 | A | 12/1997 | Hartmann |
| 5,917,798 | A | 6/1999 | Horimai et al. |
| 6,414,296 | B1 | 7/2002 | Edwards |
| 2002/0015376 | A1 | 2/2002 | Liu et al. |
| 2003/0228071 | A1 | 12/2003 | Gimenez et al. |
| 2005/0036182 | A1* | 2/2005 | Curtis et al. .................. 359/15 |

FOREIGN PATENT DOCUMENTS

| EP | 0855717 | 7/1998 |
| EP | 1059574 | 12/2000 |
| EP | 1460622 | 9/2004 |

* cited by examiner

*Primary Examiner*—William Korzuch
*Assistant Examiner*—Christopher Lamb
(74) *Attorney, Agent, or Firm*—Bacon & Thomas, PLLC

(57) ABSTRACT

In a holographic recording apparatus having a hologram medium for storing an interference pattern between a reference beam and a modulated signal beam, a double-layered mask for modulating a signal beam with data to generate the modulated signal beam has a first and a second opaque film and a transparent plate inserted therebetween. The first and the second opaque film face each other and have a plurality of first and second recording tracks, respectively. The first and the second recording tracks are alternately arranged, wherein the data to modulate the signal beam therewith are alternately embedded along the first and the second recording tracks such that one of two neighboring recording tracks is one of the first recording tracks and the other is one of the second recording tracks.

21 Claims, 11 Drawing Sheets

A > B

HOLOGRAPHIC RECORDING AND RECONSTRUCTING APPARATUS AND MASK FOR USE THEREIN

FIELD OF THE INVENTION

The present invention relates to a holographic ROM (read-only memory) system; and, more particularly, to a holographic recording apparatus, a holographic reconstructing apparatus and a mask for use in the holographic recording apparatus capable of achieving a focusing servo.

BACKGROUND OF THE INVENTION

A conventional holographic memory system usually employs a page-oriented storage approach. An input device such as an SLM (spatial light modulator) presents recording data in the form of a two dimensional array (referred to as a page), while a detector array such as a CCD camera is used to retrieve the recorded data page upon readout. Other architectures have also been proposed wherein a bit-by-bit recording is employed in lieu of the page-oriented storage approach. All of these systems, however, suffer from a common drawback in that they require the recording of a huge number of separate holograms in order to fill the memory to capacity. A typical page-oriented storage system using a megabit-sized array would require a recording of hundreds of thousands of hologram pages to reach the capacity of 100 GB or more. Even with the holographic exposure times of millisecond-order, the total recording time required for filling a 100 GB-order memory may easily amount to at least several tens of minutes, if not hours. Thus, a conventional holographic recording apparatus for use in a conventional holographic ROM system such as the one shown in FIG. 1 has been developed, where the time required to produce a 100 GB-order capacity disc may be reduced to under a minute, and potentially to the order of seconds.

The conventional holographic recording apparatus shown in FIG. 1 includes a light source 10, half wave plates (HWPs) 12, 22, a polarizing beam splitter (PBS) 14, mirrors 16, 24, 26, a conical mirror 18, a hologram medium 20, an expanding unit 28, and a mask 30.

The light source 10 emits a laser beam of a constant wavelength, e.g., a wavelength of 532 nm. The laser beam, which is consisted of only one type of linear polarization, e.g., either P-polarization or S-polarization, is provided to the HWP 12. The HWP 12 rotates the polarization of the laser beam by θ degree (preferably 45°) And then, the polarization-rotated laser beam is fed to the PBS 14.

The PBS 14, which is manufactured by repeatedly depositing at least two kinds of materials each of which has a different refractive index, serves to transmit one type of polarized laser beam, e.g., P-polarized beam, and reflect the other type of the polarized laser beam, e.g., S-polarized beam. Thus the PBS 14 divides the polarization-rotated laser beam into a transmitted laser beam (hereinafter, a reference beam) and a reflected laser beam (hereinafter, a signal beam) having different polarizations, respectively.

The reference beam, e.g., of a P-polarization, is reflected by the mirror 16, and the reference beam is projected onto the conical mirror 18, the conical mirror 18 being of a circular cone mirror having a circular base with a preset base angle between the circular cone and the circular base. The reference beam is reflected once more by the conical mirror 18 to propagate toward the hologram medium 20. The incident angle of the reference beam on the hologram medium 20 is determined by the base angle of the conical mirror 18. The geometry of the circular cone mirror is specified in order that the incident angle of the reference beam is constant at all positions on the hologram medium 20.

On the other hand, the signal beam, i.e., of an S-polarization, is projected to the HWP 22. The HWP 22 converts the polarization of the signal beam such that the polarization of the signal beam becomes identical to that of the reference beam. The signal beam is sequentially reflected by the mirrors 24 and 26, so that the signal beam may be fed to the expanding unit 28. The expanding unit 28 expands a beam size of the signal beam so as to make it have a suitable dimension relative to the mask 30 and the hologram medium 20. The signal beam is preferably a collimated beam which has planar wavefronts that are perpendicular to their direction of propagation. The signal beam is projected to the mask 30. The mask 30 has an opaque film deposited on a transparent plate, wherein the opaque film has a data pattern, e.g., spiral tracks with a predetermined track pitch. Hundreds to thousands of digital data to be recorded are embedded in a shape of a sequence of, e.g., slits, on the spiral tracks. Specifically, the digital data constituted with binary bits may be marked on a bit-by-bit basis on the spiral tracks in the opaque film. The collimated signal beam of, e.g., a normally incident plane wave, is modulated with the digital data embedded on the spiral tracks of the mask 30 so that the modulated signal beam is projected onto the hologram medium 20.

The hologram medium 20 is, e.g., a disk-shaped material for recording the data patterns. Specifically, the reference beam and the modulated signal beam interfere with each other within the hologram medium 20 so that the interference pattern between the reference beam and the modulated signal beam may be recorded as a hologram in the hologram medium 20.

Referring to FIG. 2, there is shown a block diagram to illustrate a conventional apparatus for reconstructing the hologram without a focusing servo mechanism. The apparatus includes a light source 50, a reducing unit 52, a mirror 54, a motor 55, the hologram medium 20 coated with a coating film 56, first and second lenses 58, 62, a pinhole plate 60 and a detector 64. The hologram medium 20 has included the interference patterns created by the modulated signal beam and the reference beam which are coherent with each other as described above.

The modulated signal beam may be reconstructed by illuminating the interference patterns with a reconstructing beam, of the same wavelength but with wavefronts that are "complex conjugate" (the reverse wavefront and the reverse direction) to the wavefronts in the reference beam. In other words, the light source 50 generates a laser beam which is the complex conjugate of the reference beam. The laser beam is provided to the reducing unit 52, in which the beam size of the laser beam is reduced to a predetermined size, i.e., 100 μm. The reduced laser beam is reflected by the mirror 54 and then provided into the hologram medium 20 as the reconstructing beam.

Since the reconstructing beam, being the complex conjugate of the reference beam, propagates in the reverse direction of the reference beam, the interference patterns impart a reconstructed signal beam that is identical to the complex conjugate of the modulated signal beam. Therefore, the reconstructed signal beam appears to be released from the interference patterns in "reverse" to the modulated signal beam as shown in FIG. 2.

The reconstructed signal beam is introduced through the first lens 58, the pinhole plate 60 and the second lens 62 to the detector 64. Specifically, the reconstructed signal beam is diffracted with a diffraction angle θ and then converged by the first lens 58 to the pinhole plate 60. Since the track pitch between two neighboring tracks on the spiral tracks in the hologram medium 20 is at most several μm, a number of tracks may be illuminated with the reconstructed signal beam of 100 μm in diameter so that a number of tracks may be simultaneously reconstructed as the reconstructed signal beam. Referring to FIG. 3, there is shown a plan view of an exemplary pinhole plate 60 with a pinhole 60a, wherein a pinhole width S of the pinhole 60a in the pinhole plate 60 corresponds to a track width of each spiral track itself in the hologram medium 20. Through the pinhole 60a in the pinhole plate 60, only a portion corresponding to each spiral track among the reconstructed signal beam may be transmitted. The reconstructed signal beam transmitted through the pinhole 60a may be diffracted once more and converged by the lens 62 to the detector 64.

In order that the detector 64 detects the reconstructed signal beam precisely, a focusing servo between the detector 64 and the hologram medium 20 must be operated. Referring to FIGS. 4A to 4C, there are shown an inside, a normal and an outside focusing at the pinhole 60a of the pinhole plate 60, respectively. In case of the inside focusing shown in FIG. 4A, the reconstructed signal beam to be transmitted through the pinhole 60a is so weak that the pinhole plate 60 as well as the detector 64 must be controlled to move near to the hologram medium 20 to obtain a normal focusing. Also, in case of the outside focusing shown in FIG. 4C, the reconstructed signal beam to be transmitted through the pinhole 60a is so weak that the pinhole plate 60 as well as the detector 64 must be controlled to move away from the hologram medium 20 to obtain a normal focusing. Since, however, both the inside and the outside focusing are not different from each other in that the reconstructed signal beam is so weak, a focusing servo signal to control the distance between the pinhole 60a of the pinhole plate 60 and the hologram medium 20 or the distance between the detector 64 and the hologram medium 20 cannot be obtained under the conventional holographic ROM system described above.

SUMMARY OF THE INVENTION

It is, therefore, a primary object of the present invention to provide a holographic recording apparatus having a double-layered mask capable of achieving a focusing servo.

It is another object of the present invention to provide a holographic reconstructing apparatus capable of achieving a focusing servo by using a holographic medium recorded with the double-layered mask.

It is still another object of the present invention to provide a double-layered mask for use in a holographic recording apparatus capable of achieving a focusing servo.

In accordance with a preferred embodiment of the present invention, there is provided a holographic recording apparatus comprising:

means for generating a reference beam and a signal beam;

a mask for modulating the signal beam with data to generate a modulated signal beam; and a hologram medium for storing an interference pattern between the reference beam and the modulated signal beam, wherein the mask has a first and a second opaque film and a transparent plate inserted therebetween, the first and the second opaque film facing each other, the first and the second opaque film have a first and a second recording track group, respectively, and the first and the second recording track group have a plurality of first and second recording tracks, respectively, the first and the second recording tracks being alternately arranged, wherein the data to modulate the signal beam therewith are alternately embedded along the first and the second recording tracks so one of two neighboring recording tracks is one of the first recording tracks and the other is one of the second recording tracks.

In accordance with another preferred embodiment of the present invention, there is provided a holographic reconstructing apparatus comprising:

a hologram medium for storing therein an interference pattern between a reference beam and a modulated signal beam, wherein the modulated signal beam is generated by modulating a signal beam with a mask, wherein the mask has a first and a second opaque film and a transparent plate inserted therebetween, the first and the second opaque film facing each other, the first and the second opaque film have a first and a second recording track group, respectively, and the first and the second recording track group have a plurality of first and second recording tracks, respectively, the first and the second recording tracks being alternately arranged, wherein the data to modulate the signal beam therewith are embedded along the first and the second recording tracks;

means for generating a reconstructing beam corresponding to the reference beam, where the reconstructing beam is illuminated on the hologram medium to reconstruct the modulated signal beam as a reconstructed signal beam;

means for detecting from the reconstructed signal beam two beam intensities corresponding to one of the first recording tracks of the first recording track group and one of the second recording tracks of the second recording track group, respectively, which are alternately arranged and adjacent to each other;

means for comparing the two beam intensities with each other to generate a focusing servo signal; and means for moving the detecting means based on the focusing servo signal to control a detecting position of the detecting means.

In accordance with still another preferred embodiment of the present invention, there is provided a mask for modulating a signal beam with data to generate a modulated signal beam in a holographic recording apparatus which includes a hologram medium for storing an interference pattern between a reference beam and the modulated signal beam, the mask comprising:

a first and a second opaque film and a transparent plate inserted therebetween, the first and the second opaque film facing each other, wherein the first and the second opaque film have a first and a second recording track group, respectively, and the first and the second recording track group have a plurality of first and second recording tracks, respectively, the first and the second recording tracks being alternately arranged, wherein the data to modulate the signal beam therewith are alternately embedded along the first and the second recording tracks so one of two neighboring recording tracks is one of the first recording tracks and the other is one of the second recording tracks.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE PREFERRED EMBODIMENTS

Figure 5:
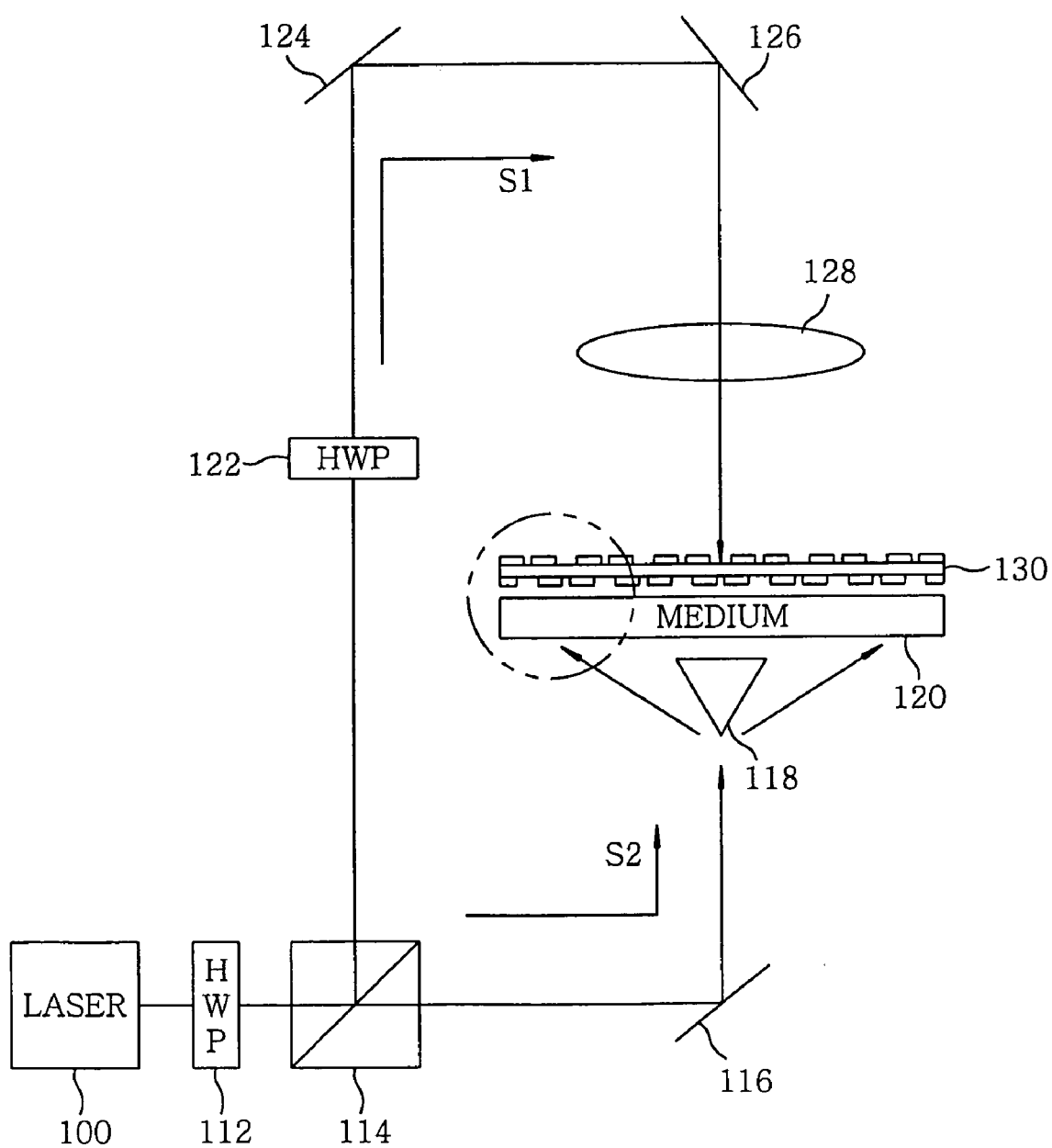
FIG. 5 illustrates a block diagram of a holographic recording apparatus in accordance with the present invention.

FIG. 5 shows a holographic recording apparatus in accordance with a preferred embodiment of the present invention. The holographic recording apparatus includes a light source 100, half wave plates (HWPs) 112 and 122, a polarizing beam splitter (PBS) 114, mirrors 116, 124, 126, a conical mirror 118, a hologram medium 120, an expanding unit 128, and a double-layered mask 130.

The light source 100 emits a laser beam with a predetermined beam size and a constant wavelength, e.g., of 532 nm. The HWP 112 rotates the polarization of the laser beam by θ degree (preferably 45°). The PBS 114 serves to transmit one type of a polarized laser beam, e.g., P-polarized beam, and reflect the other type of the polarized laser beam, e.g., S-polarized beam. Thus the PBS 114 divides the polarization-rotated laser beam into a transmitted laser beam (hereinafter, a reference beam) and a reflected laser beam (hereinafter, a signal beam) having different polarizations, respectively.

The reference beam, e.g., of a P-polarization, is reflected by the mirror 116, and the reference beam is reflected again by the conical mirror 118 to propagate toward the hologram medium 120. The incident angle of the reference beam on the hologram medium 120 is determined by the base angle of the conical mirror 118 and is constant at all positions on the hologram medium 120.

On the other hand, the signal beam, i.e., of an S-polarization, is projected to the HWP 122, which converts the polarization of the signal beam such that the polarization of the signal beam becomes identical to that of the reference beam. The signal beam is sequentially reflected by the mirrors 124 and 126 so that the signal beam may be fed to the expanding unit 128. The expanding unit 128 expands a beam size of the signal beam to thereby make it have a suitable dimension relative to the double-layered mask 130 and the hologram medium 120. The signal beam is preferably a collimated beam which has planar wavefronts that are perpendicular to their direction of propagation. The signal beam is projected to the double-layered mask 130.

Figure 1:
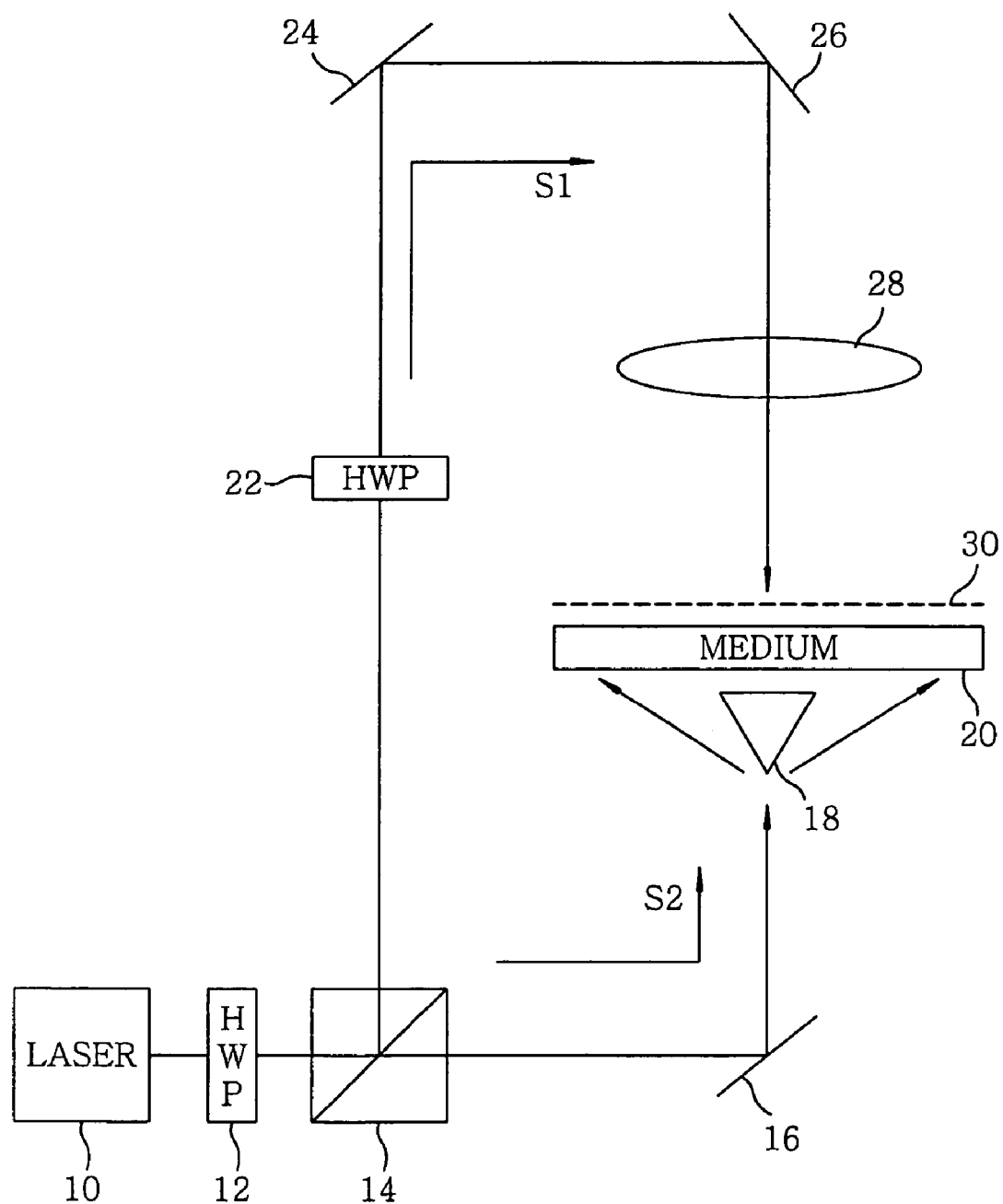
FIG. 1 shows a block diagram of a conventional holographic recording apparatus.
Figure 2:
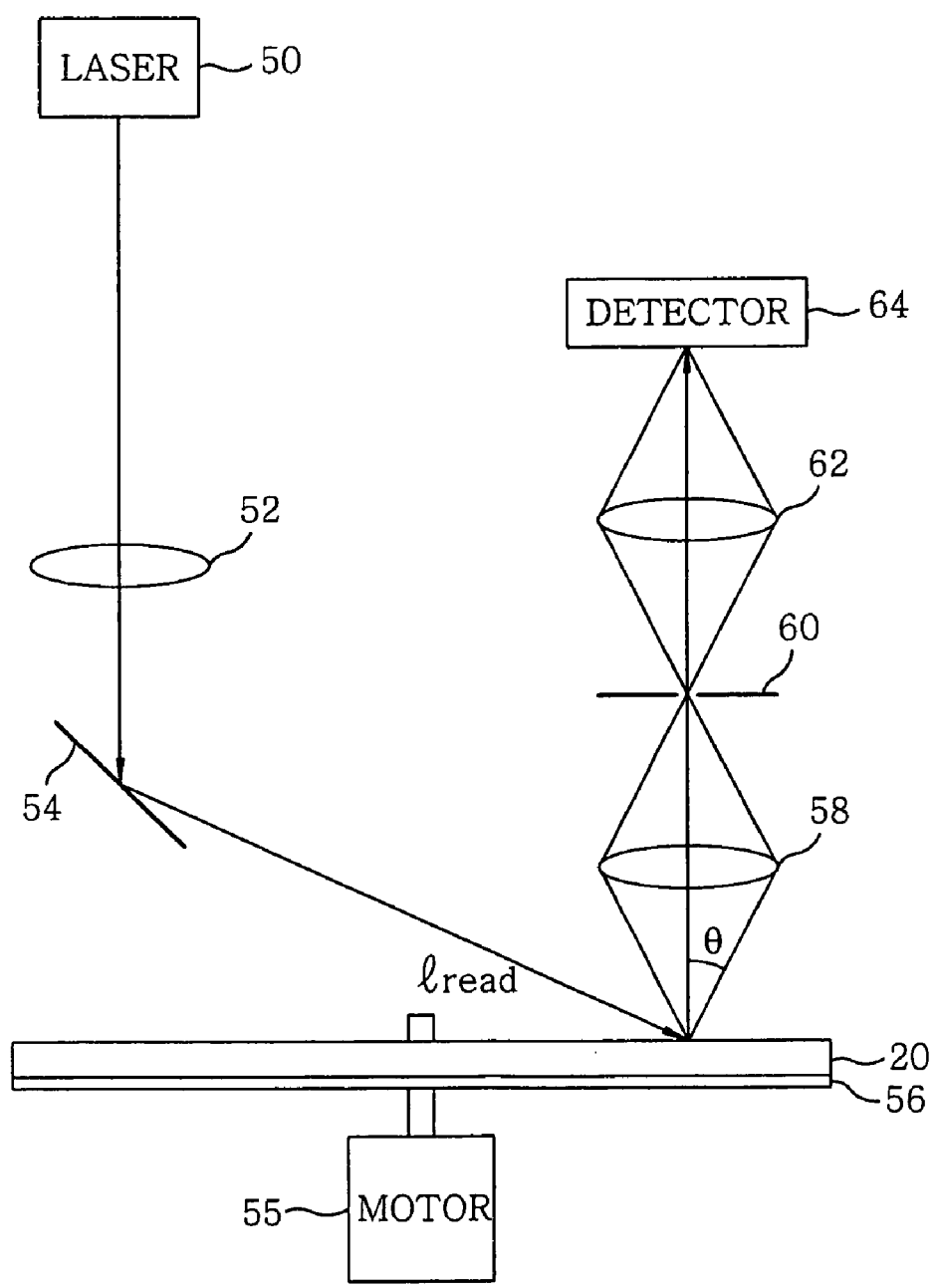
FIG. 2 describes a block diagram of a conventional holographic reconstructing apparatus without a focusing servo mechanism.
Figure 3:
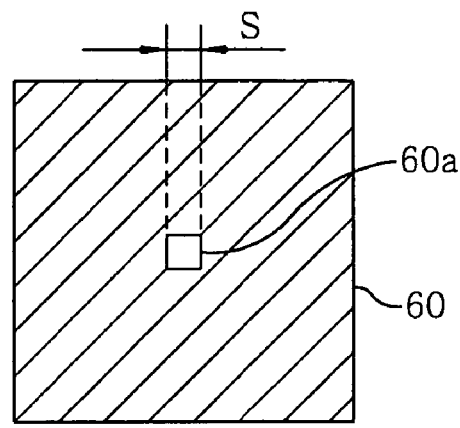
FIG. 3 represents a plan view of a conventional pinhole plate included in the holographic reconstructing apparatus of FIG. 2.
Figure 4A:
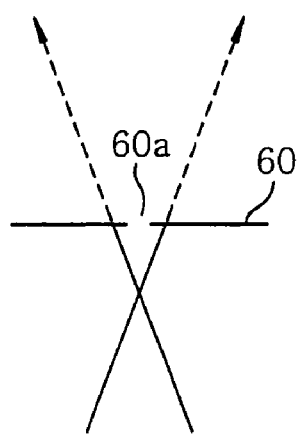
FIGS. 4A to 4C offer an inside, a normal and an outside focusing at a pinhole of the pinhole plate of FIG. 3, respectively.
Figure 4B:
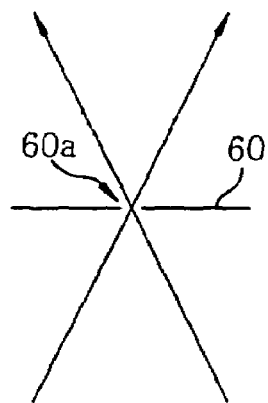
Figure 4C:
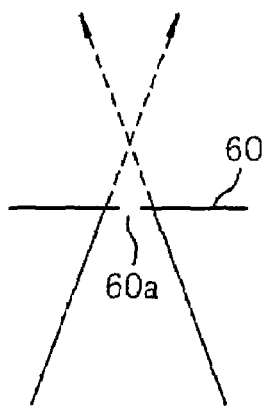
Figure 6:
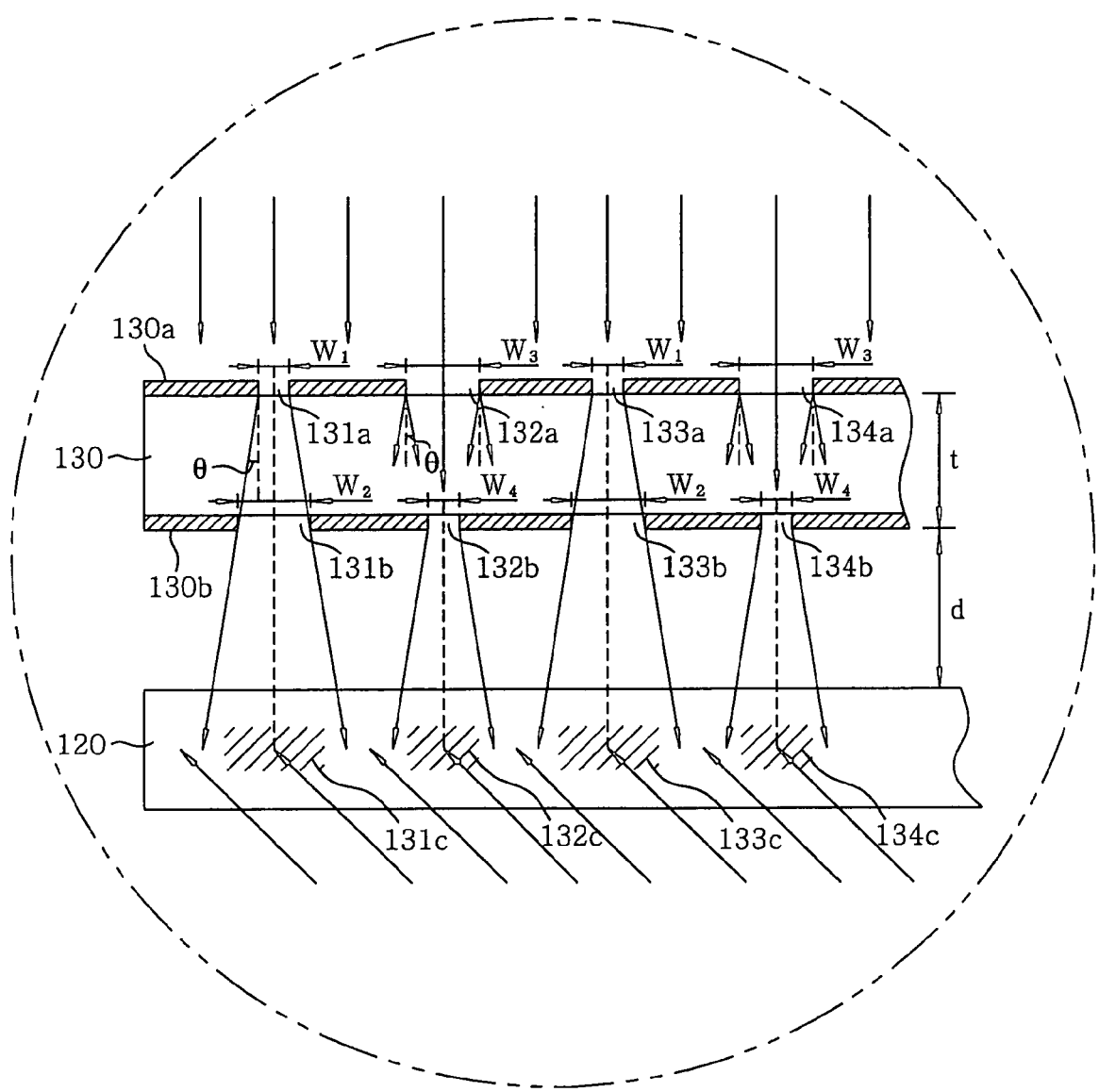
FIG. 6 explains a cross-sectional view of a double-layered mask shown in FIG. 5 for illustrating a principle for recording a hologram in a hologram medium in accordance with the present invention.

Referring to FIG. 6, there is shown a cross-sectional detailed view of the double-layered mask 130 shown in FIG. 5 in accordance with the present invention. Specifically, the double-layered mask 130 serves to generate a data pattern for recording as in the conventional mask 30 of FIG. 1, but differs therefrom in that the double-layered mask 130 is made of a transparent plate with a thickness t and a first and a second opaque film 130a and 130b coated on two opposite surfaces, i.e., a first and a second surface, of the transparent plate, respectively. Accordingly, the first and the second opaque film 130a and 130b face each other. The first and the second opaque film 130a and 130b have a first and a second recording track group, respectively. The first and the second recording track group have a plurality of first and second recording tracks, respectively. The first and the second recording tracks 131a, 132b, 133a, 134b are alternately arranged, wherein the data to be used to modulate the signal beam therewith are alternately embedded along the first and the second recording tracks 131a, 132b, 133a, 134b and so one of two neighboring recording tracks is one of the first recording tracks 131a, 133a while the other is one of the second recording tracks 132b, 134b.

For illustration, two first recording tracks 131a, 133a with a recording track width $W_1$ for diffracting the signal beam to obtain the modulated signal beam are assumed to be formed in the first opaque film 130a. If the signal beam transmitted through the first recording tracks 131a, 133a has been diffracted with a diffraction angle θ, two second opening tracks 131b, 133b corresponding to the first recording tracks 131a, 133a must have an opening width $W_2$ larger than the recording track width $W_1$ of the first recording tracks 131a, 133a in order that the signal beam transmitted through the first recording tracks 131a, 133a may be diffracted as the modulated signal beam without being disturbed any further by the second opening tracks 131b, 133b, respectively. It is preferable that the opening width $W_2$ of the second opening tracks 131b, 133b is equal to or larger than $W_1+2t \tan θ$, wherein t is the thickness of the transparent plate, i.e., a separation between the first and the second opaque film. In the result, a second opening track group made of a plurality of second opening tracks causes the modulated signal beam to be propagated without changing the optical properties. It is preferable that the second opening track group faces the first recording track group.

In the meantime, two second recording tracks 132b, 134b with a recording track width $W_4$ for diffracting the signal beam to obtain the modulated signal may be formed in the second opaque film 130b. Since the signal beam is inherently diffracted with a diffraction angle θ, first opening tracks 132a, 134a must have a large opening width in order that the signal beam diffracted by two end portions of each of the first opening tracks 132a, 134a may not disturb the signal beam to be directly illuminated on the second recording tracks 132b, 134b. It is preferable that the opening width $W_3$ of the first opening tracks 132a, 134a is equal to or larger than $W_4+2t \tan θ$, wherein t is a separation between the first and the second opaque film. In the results, a first opening track group of a plurality of first opening tracks causes the signal beam to be illuminated on the second recording tracks without changing the optical properties. It is preferable that the first opening track group faces the second recording track group.

Figure 7A:
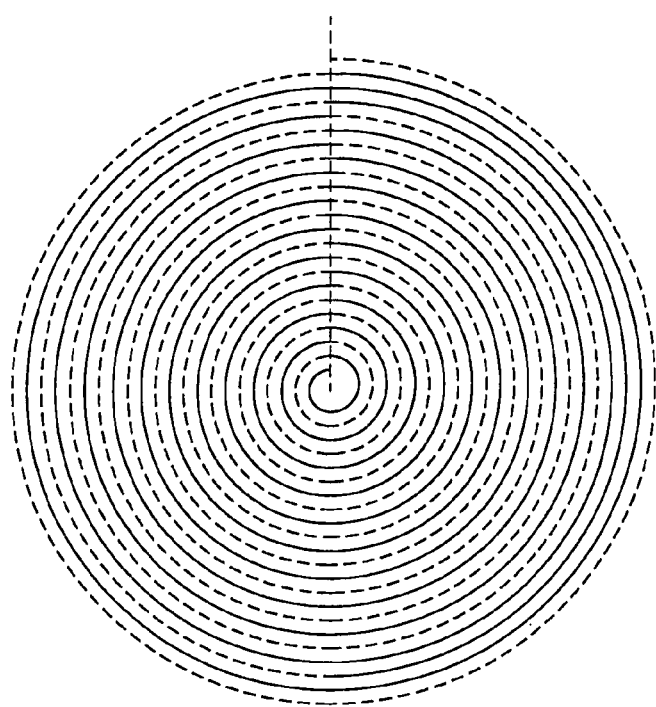
FIGS. 7A and 7B are plan views of a spiral-like structure and a concentric-like structure of first and second recording track group in the double-layered mask shown in FIG. 6, respectively.
Figure 7B:
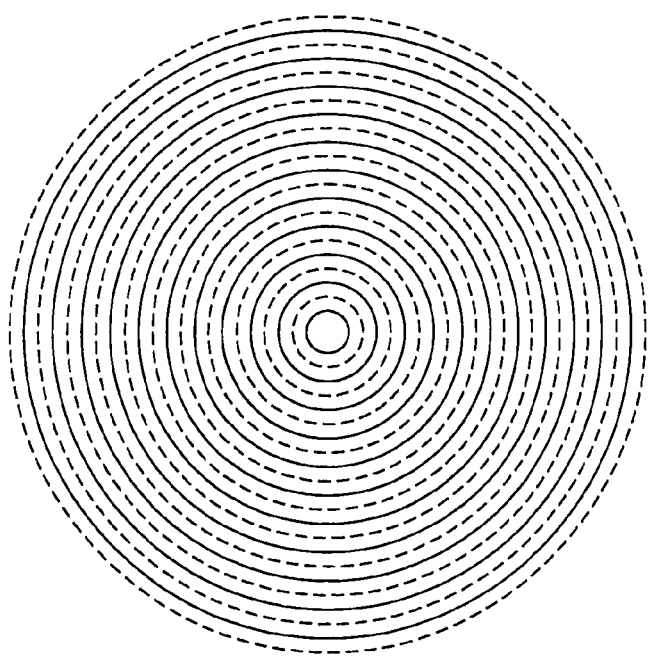

Referring to FIGS. 7A and 7B, there are shown plan views of a spiral-like structure and a concentric-like structure made of the first and the second recording track group in the double-layered mask 130 shown in FIG. 5, respectively. If the solid line represents the first recording track group embedded in the first opaque film 130a coated on the first surface of the transparent plate 130, the dotted line represents the second recording track group embedded in the second opaque film 130b coated on the second surface of the transparent plate 130 and vice versa. In FIG. 7A, each of the first and the second recording track group, being apart from each other by the thickness of the transparent plate 130, is formed, in overall, of a spiral-like structure. The first and the second recording track group have the first and the second recording tracks, respectively, which are alternately arranged. Accordingly, a first recording track of the first recording track group is followed by a second recording track of the second recording track group, a next first recording track of the first recording track group by a next second recording track of the second recording track group and so on. In the meantime, in FIG. 7B, the first and the second recording tracks of the first and the second recording track group are substantially formed of circles which are concentric with each other.

Referring back to FIG. 6, the signal beam transmitted through and diffracted by the first and the second recording tracks 131a, 132b, 133a, 134b is interfered as the modulated signal beam with the reference beam to generate interference patterns 131c, 132c 133c, 134c to be recorded as a hologram within the hologram medium 120, which preferably is of a CD-like disc shape. In FIG. 6, d is a distance between the hologram medium 120 and the second opaque film 130b.

Figure 8:
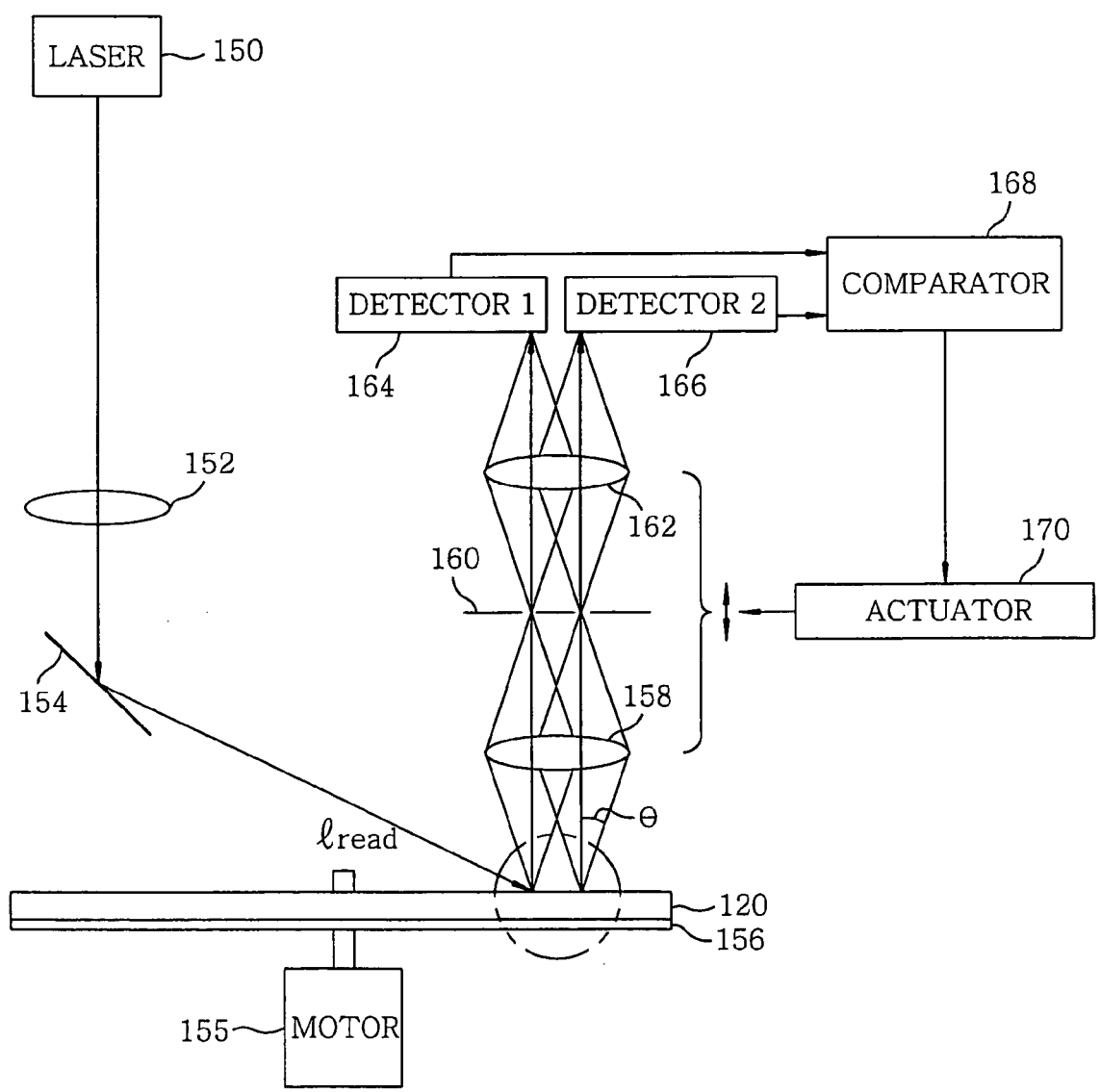
FIG. 8 presents a block diagram of a holographic reconstructing apparatus in accordance with the present invention.

Referring to FIG. 8, there is shown a block diagram to illustrate an apparatus for reconstructing the hologram capable of achieving a focusing servo in accordance with the present invention. The apparatus includes a light source 150, a reducing unit 152, a mirror 154, a motor 155, the hologram medium 120 coated with a coating film 156, a first and a second lens 158 and 162, a pinhole plate 160, a first and a second detector 164 and 166, a comparator 168 and an actuator 170. The hologram medium 120 has included the interference patterns created by the modulated signal beam and the reference beam which are coherent with each other as described above.

The data pattern may be reconstructed by illuminating the interference patterns with a reconstructing beam, of the same wavelength but with wavefronts that are "complex conjugate" (the reverse wavefront and the reverse direction) to the wavefronts in the reference beam. In other words, the light source 150 generates a laser beam that is a complex conjugate of the reference beam. The laser beam is provided to the reducing unit 152, in which the beam size of the laser beam is reduced to a predetermined size, e.g., 100 µm. The reduced laser beam is reflected by the mirror 154 and then propagates toward the hologram medium 120 as the reconstructing beam.

Figure 9:
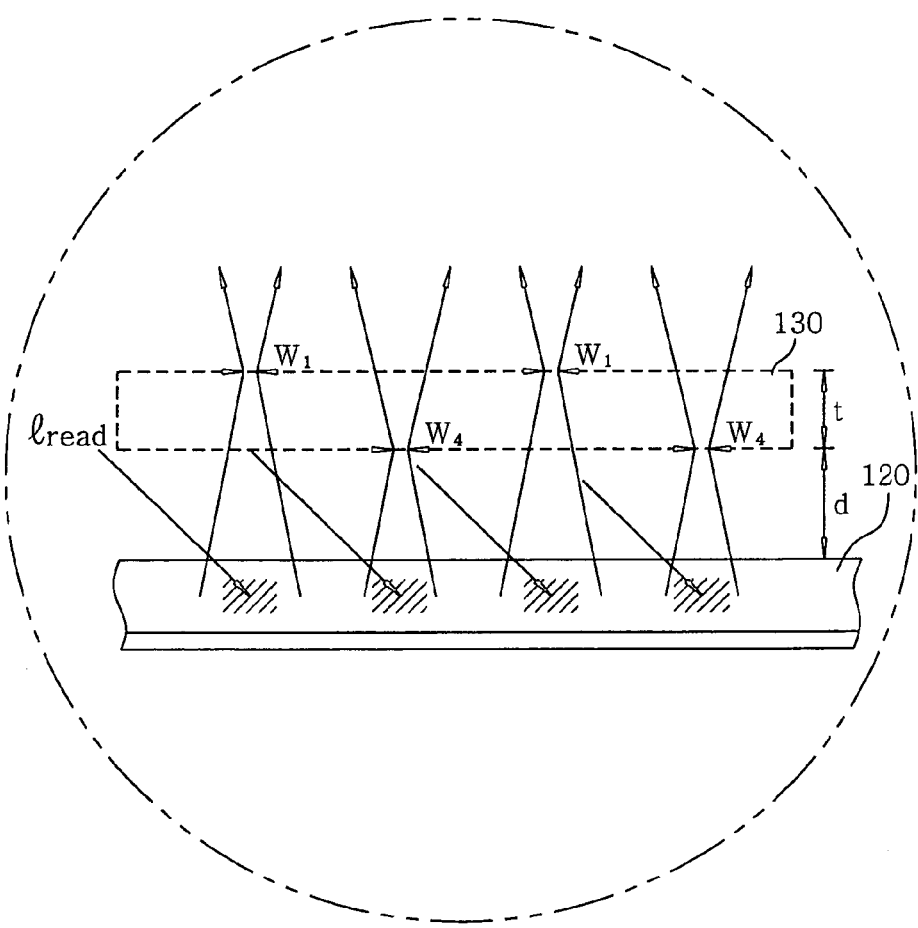
FIG. 9 depicts a principle for reconstructing a modulated signal beam in the hologram medium in accordance with the present invention.

Since the reconstructing beam, being the complex conjugate of the reference beam, propagates in the reverse direction of the reference beam, the interference patterns impart a reconstructed signal beam that is substantially identical to the complex conjugate of the modulated signal beam. Therefore, the reconstructed signal beam appears to be released from the interference patterns in "reverse" to the modulated signal beam as shown in FIGS. 8 and 9. The reconstructed signal beam passes back through virtual tracks $W_1$ and $W_4$, wherein the virtual tracks correspond to the first and the second recoding track that were originally present during the recording process of the modulated signal beam. Specifically, since the first recording track group in the first opaque film 130a and the second recording track group in the second opaque film 130b were apart from the hologram medium 120 during the recording process by t+d and d, respectively, the reconstructed signal beam is also converged to the virtual tracks apart by "t+d" or d from the hologram medium 120 and, then, diffracted as if the virtual tracks were present.

Referring back to FIG. 8, the reconstructed signal beam is introduced through the first lens 158, the pinhole plate 160 and the second lens 162 to the detector 164. Specifically, the reconstructed signal beam is diffracted with a diffraction angle θ and then converged by the lens 158 to the pinhole plate 160. Since a track pitch between two neighboring recording tracks of the first and the second recording track group in the hologram medium 120 is at most several µm, a number of recording tracks may be illuminated with the reconstructed signal beam of 100 µm in diameter so that a number of recording tracks may be simultaneously reconstructed as the reconstructed signal beam.

Figure 10:
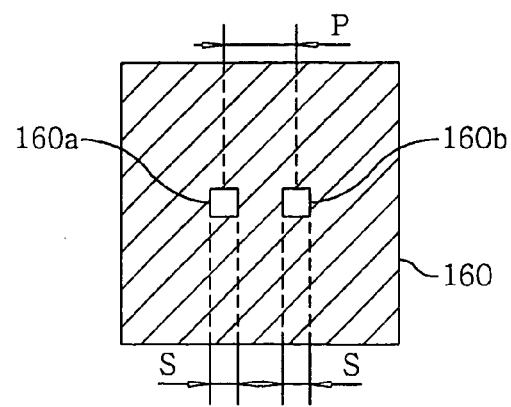
FIG. 10 portrays a plan view of a pinhole plate with two pinholes included in the holographic reconstructing apparatus of FIG. 7.

Referring to FIG. 10, there is shown an exemplary pinhole plate 160 with two pinholes 160a and 160b, wherein each pinhole width S of two pinholes 160a and 160b in the pinhole plate 160 corresponds to a recording track width of the first and the second recording track themselves in the hologram medium 120 and a distance P between two pinholes 160a, 160b corresponds to a track pitch between two neighboring recording tracks. Through each of two pinholes 160a, 160b in the pinhole plate 160, only a portion corresponding to one of the first and the second recording track among the reconstructed signal beam may be transmitted. Portions of the reconstructed signal beam transmitted through two pinholes 160a, 160b may be diffracted once more and, then, converged by the second lens 162 to the first and the second detector 164, 166, respectively.

In order to realize a focusing servo between the pinhole plate 160 and the hologram medium 120, the first and the second detector 164, 166 detect beam intensities A, B of the portions of the reconstructed signal beam transmitted through two pinholes 160a, 160b, respectively, the comparator 168 compares the beam intensities A, B with each other to generate a focusing servo signal, and the actuator 170 uses the focusing servo signal to move the pinhole plate 160 near to or far from the hologram medium 120, wherein the pinhole plate 160 is preferably integrated with the first and the second lens 158, 162 and the first and the second detector 164, 166.

Figure 11A:
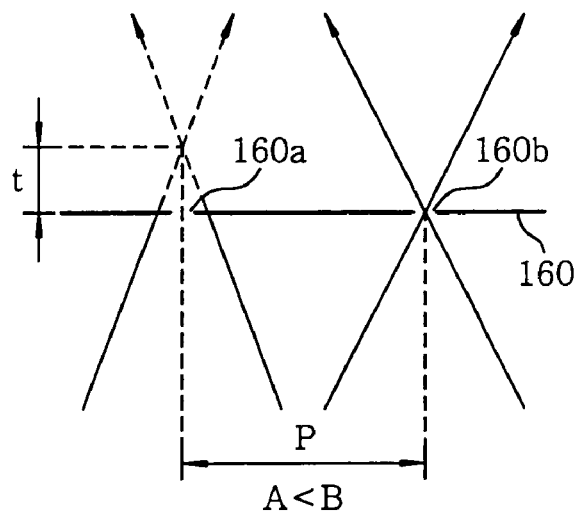
FIGS. 11A to 11C express a principle for obtaining a focusing servo signal related to a present focusing servo mechanism by using the pinhole plate with two pinholes in accordance with the present invention.
Figure 11B:
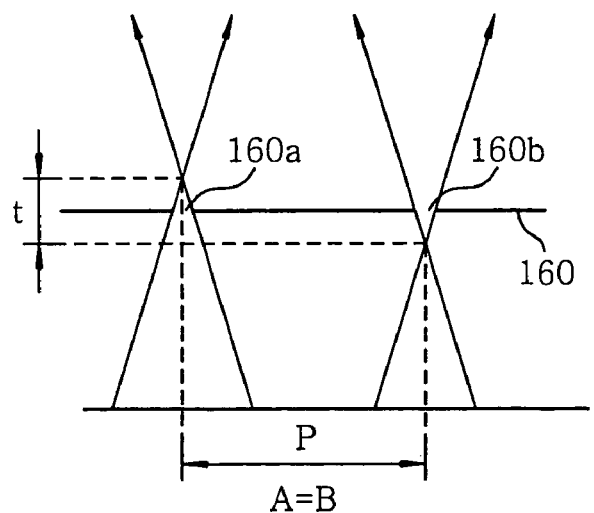
Figure 11C:
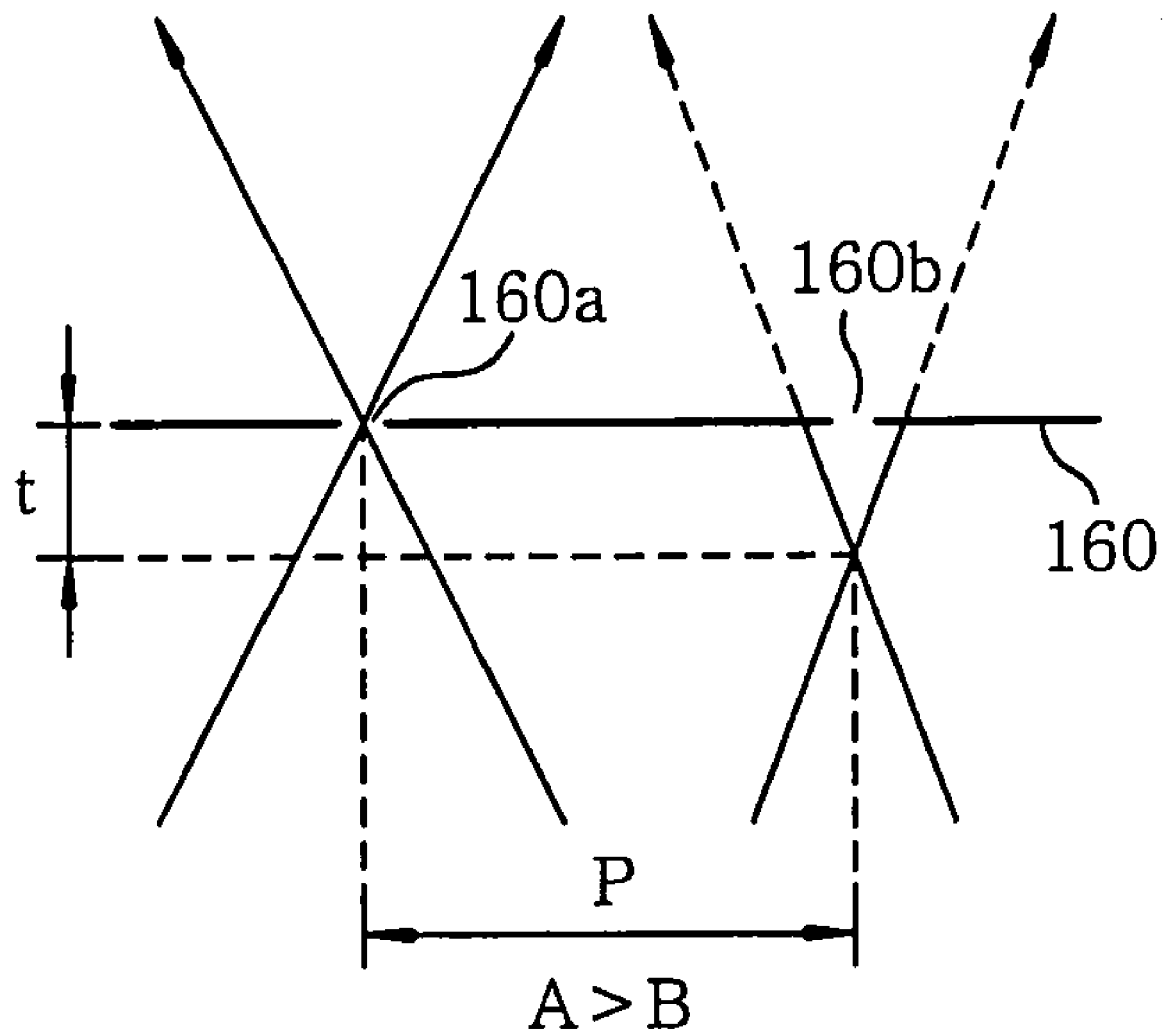

Referring to FIGS. 11A to 11C, there are shown three exemplary focusing states based on three different positions of the pinhole plate 160. In accordance with the present invention, the focusing surfaces of the reconstructed signal beam transmitted through two pinholes 160a, 160b are apart from each other by the thickness t of the transparent plate, i.e., by the separation between the first and the second opaque film 130a, 130b, as shown in FIG. 7.

In FIGS. 11A and 11C, there are shown two exemplary cases in which one of the two neighboring recording tracks is in-focused while the other recording track is inherently out-focused. Accordingly, the beam intensity A of the reconstructed signal beam corresponding to the first recording track is larger than the beam intensity B of the reconstructed signal beam corresponding to the second recording track, i.e., A>B, or vise versa, i.e., A<B. The comparator 168 generates the focusing servo signal by comparing the beam intensity A of the first recording track with the beam intensity B of the second recording track neighboring to the first recording track and the actuator 170 uses the focusing servo signal to make the pinhole plate 160, which is integrated with the first and the second lens 158, 162 and the first and the second detector 164, 166, move into or outward the hologram medium 120 until the beam intensity A is substantially equal to the beam intensity B. In case that the beam intensity A in the first recording track is substantially equal to that in the second recording track as shown in FIG. 11B, i.e., A≅B, the focusing servo has been completed.

While the invention has been shown and described with respect to the preferred embodiments, it will be understood by those skilled in the art that various changes and modifications may be made without departing from the spirit and the scope of the invention as defined in the following claims.

What is claimed is:

1. A holographic recording apparatus comprising:
    means for generating a reference beam and a signal beam;
    a mask for modulating the signal beam with data to generate a modulated signal beam; and
    a hologram medium for storing an interference pattern between the reference beam and the modulated signal beam,
    wherein the mask has a first and a second opaque film and a transparent plate inserted therebetween, the first and the second opaque film facing each other,
    the first and the second opaque film have a first and a second recording track group, respectively, and
    the first and the second recording track group have a plurality of first and second recording tracks, respectively, the first and the second recording tracks being alternately arranged, wherein the data to modulate the signal beam therewith are alternately embedded along the first and the second recording tracks such that one of two neighboring recording tracks is one of the first recording tracks and the other is one of the second recording tracks.

2. The holographic recording apparatus of claim 1, wherein the data are embedded in a shape of a series of slits along the first and the second recording tracks.

3. The holographic recording apparatus of claim 1, wherein the first and the second recording tracks are formed in overall of a spiral-like structure.

4. The holographic recording apparatus of claim 1, wherein the first and the second tracks are substantially formed of circles which are concentric with each other.

5. The holographic recording apparatus of claim 1, wherein the first and the second opaque film have a first and a second opening track group for transmitting the signal beam and the modulated signal beam without changing optical properties thereof, respectively, the first recording track group facing the second opening track group while the second recording track group facing the first opening track group.

6. The holographic recording apparatus of claim 5, wherein an opening width of each opening track of the first and the second opening track group is larger than that of each recording track of the first and the second recording track group.

7. The holographic recording apparatus of claim 6, wherein an opening width $W_2$ of said each opening track satisfies a following relation:

$$W_2 \geq W_1 + 2t \tan\theta$$

wherein $W_1$ is a recording track width of said each recording track, t is a separation between the first recording track group and the second opening track group or between the first opening track group and the second recording track group and θ is a diffraction angle of the signal beam or the modulated signal beam.

8. The holographic recording apparatus of claim 1, wherein the reference beam and the signal beam have a same wavelength and a same polarization.

9. The holographic recording apparatus of claim 1, wherein the reference beam and the modulated signal beam are projected on the hologram medium and an angle between the reference beam and the modulated signal beam is constant.

10. A holographic reconstructing apparatus comprising:
    a hologram medium for storing therein an interference pattern between a reference beam and a modulated signal beam, wherein the modulated signal beam is generated by modulating a signal beam with a mask, wherein the mask has a first and a second opaque film and a transparent plate inserted therebetween, the first and the second opaque film facing each other, the first and the second opaque film have a first and a second recording track group, respectively, and the first and the second recording track group have a plurality of first and second recording tracks, respectively, the first and the second recording tracks being alternately arranged, wherein the data to modulate the signal beam therewith are embedded along the first and the second recording tracks;
    means for generating a reconstructing beam corresponding to the reference beam, wherein the reconstructing beam is illuminated on the hologram medium to reconstruct the modulated signal beam as a reconstructed signal beam;
    means for detecting from the reconstructed signal beam two beam intensities corresponding to one of the first recording tracks of the first recording track group and one of the second recording tracks of the second recording track group, respectively, which are alternately arranged and adjacent to each other;
    means for comparing the two beam intensities with each other to generate a focusing servo signal; and
    means for moving the detecting means based on the focusing servo signal to control a detecting position of the detecting means.

11. The holographic reconstructing apparatus of claim 10, wherein the detecting means is movable until the two beam intensities are substantially equal.

12. The holographic reconstructing apparatus of claim 10, wherein the reconstructing beam is a complex conjugate of the reference beam.

13. The holographic reconstructing apparatus of claim 10, wherein the detecting means includes:
    means for converging the reconstructed signal beam;
    a pinhole plate having two pinholes, wherein two pinholes are used to separate from the converged reconstructed signal beam two adjacent beams corresponding to said one of the first recording tracks and said one of the second recording tracks which are alternately arranged and adjacent to each other; and
    means for sensing the two beam intensities of the two adjacent beams, respectively.

14. The holographic reconstructing apparatus of claim 13, wherein the sensing means has:

means for converging the two adjacent beams; and two detectors for detecting the two beam intensities of the two adjacent beams, respectively.

15. A mask for modulating a signal beam with data to generate a modulated signal beam in a holographic recording apparatus which includes a hologram medium for storing an interference pattern between a reference beam and the modulated signal beam, the mask comprising:

a first and a second opaque film and a transparent plate inserted therebetween, the first and the second opaque film facing each other, wherein the first and the second opaque film have a first and a second recording track group, respectively, and the first and the second recording track group have a plurality of first and second recording tracks, respectively, the first and the second recording tracks being alternately arranged, wherein the data to modulate the signal beam therewith are alternately embedded along the first and the second recording tracks such that one of two neighboring recording tracks is one of the first recording tracks and the other is one of the second recording tracks.

16. The mask of claim 15, wherein the data are embedded in a shape of a series of slits along the first and the second recording tracks.

17. The mask of claim 15, wherein each of the first and the second recording tracks is formed in overall of a spiral-like structure.

18. The mask of claim 15, wherein the first and the second tracks are substantially of circles which are concentric with each other.

19. The mask of claim 15, wherein the first and the second opaque film have a first and a second opening track group for transmitting the signal beam and the modulated signal beam without changing optical properties thereof, respectively, and the first recording track group facing the second opening track group while the second recording track group facing the first opening track group.

20. The mask of claim 19, wherein an opening width of each opening track of the first and the second opening track group is larger than that of each recording track of the first and the second recording track group.

21. The mask of claim 20, wherein an opening width $W_2$ of said each opening track satisfies a following equation:

$$W_2 \geq W_1 + 2t \tan \theta$$

wherein $W_1$ is a recording track width of said each recording track, t is a separation between the first recording track group and the second opening track group or between the first opening track group and the second recording track group and $\theta$ is a diffraction angle of the signal beam or the modulated signal beam.

* * * * *